United States Patent
Gordon

[15] 3,673,604
[45] June 27, 1972

[54] GRAPHIC RECORDER WITH PEN DRIVING AND ACTUATING MECHANISM

[72] Inventor: James F. Gordon, Arcadia, Calif.
[73] Assignee: Zeta Research, Inc., Lafayette, Calif.
[22] Filed: Oct. 22, 1969
[21] Appl. No.: 868,340

[52] U.S. Cl.............................................346/139 B, 346/141
[51] Int. Cl. ........................................................G01d 15/26
[58] Field of Search ..........................346/112, 139, 141, 114

[56] References Cited

UNITED STATES PATENTS

| | | | |
|---|---|---|---|
| 3,340,541 | 9/1967 | Klassen et al. | 346/141 X |
| 2,727,308 | 12/1955 | Kuhn et al. | 346/139 X |
| 3,019,072 | 1/1962 | Bose et al. | 346/29 |
| 3,127,678 | 4/1964 | Muldoon | 346/29 X |
| 3,145,070 | 8/1964 | Miller et al. | 346/141 X |
| 3,270,349 | 8/1966 | Murphy | 346/139 X |
| 3,351,949 | 11/1967 | Brown | 346/141 X |

Primary Examiner—Joseph W. Hartary
Attorney—Flehr, Hohbach, Test, Albritton & Herbert

[57] ABSTRACT

Graphic recorder for use with a strip chart in which a framework is provided having a table over which the strip chart is adapted to travel. Means is mounted on the framework for causing movement of the strip chart on the table along an X-axis. A mounting block is mounted on the framework for movement along a Y-axis. A pen is carried by the mounting block and is movable into and out of engagement with the strip chart. Solenoid means is provided for moving the pen into engagement with the strip chart. Means is provided for moving the block and the pen carried thereby along the Y-axis and for supplying energy to the solenoid for actuating the pen which includes flexible elongate elements formed of a conducting material which serves two purposes, one of which is to provide the movement of the mounting block and the other of which is to provide a conductor for the electrical energy for energizing the solenoid.

4 Claims, 7 Drawing Figures

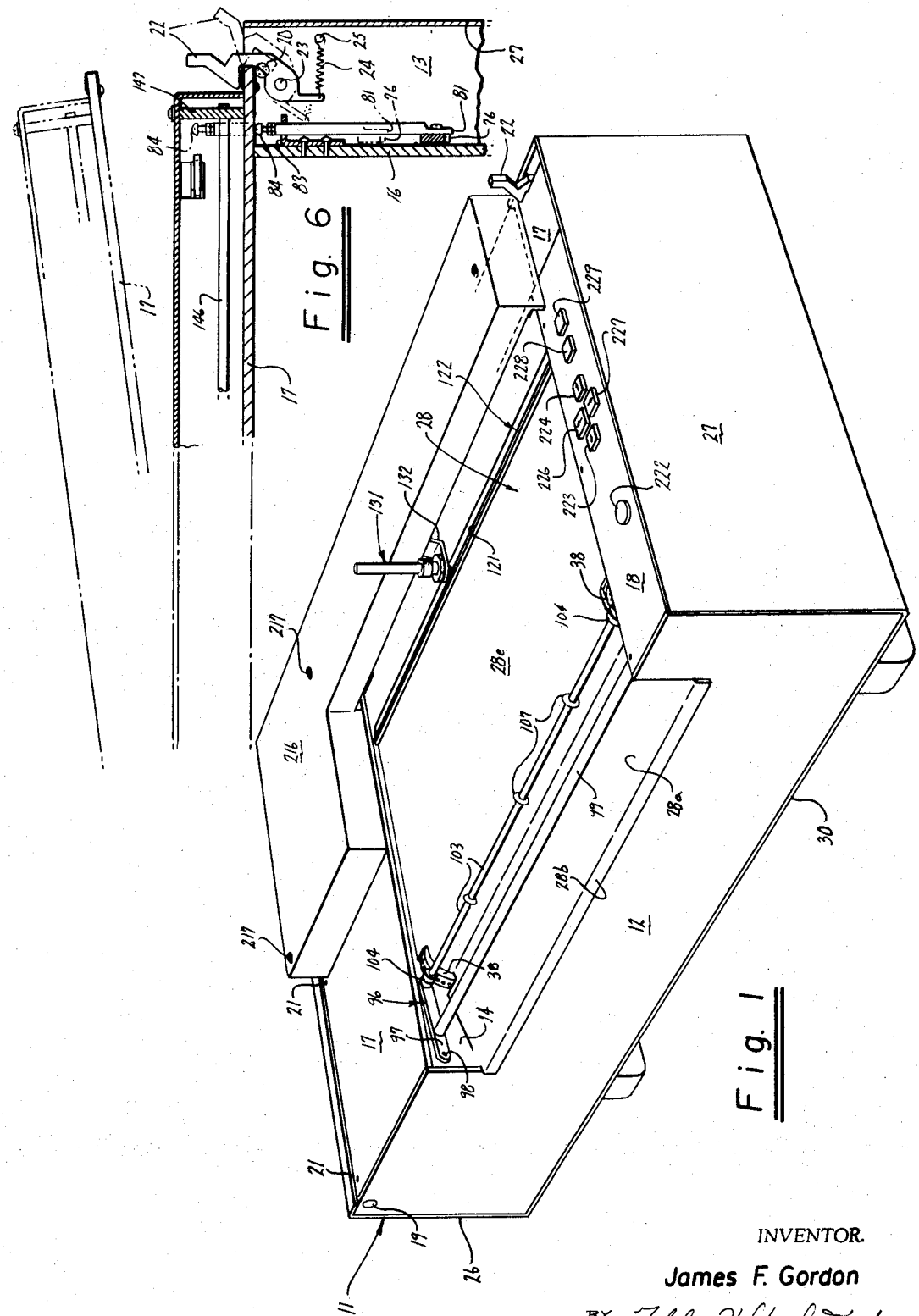

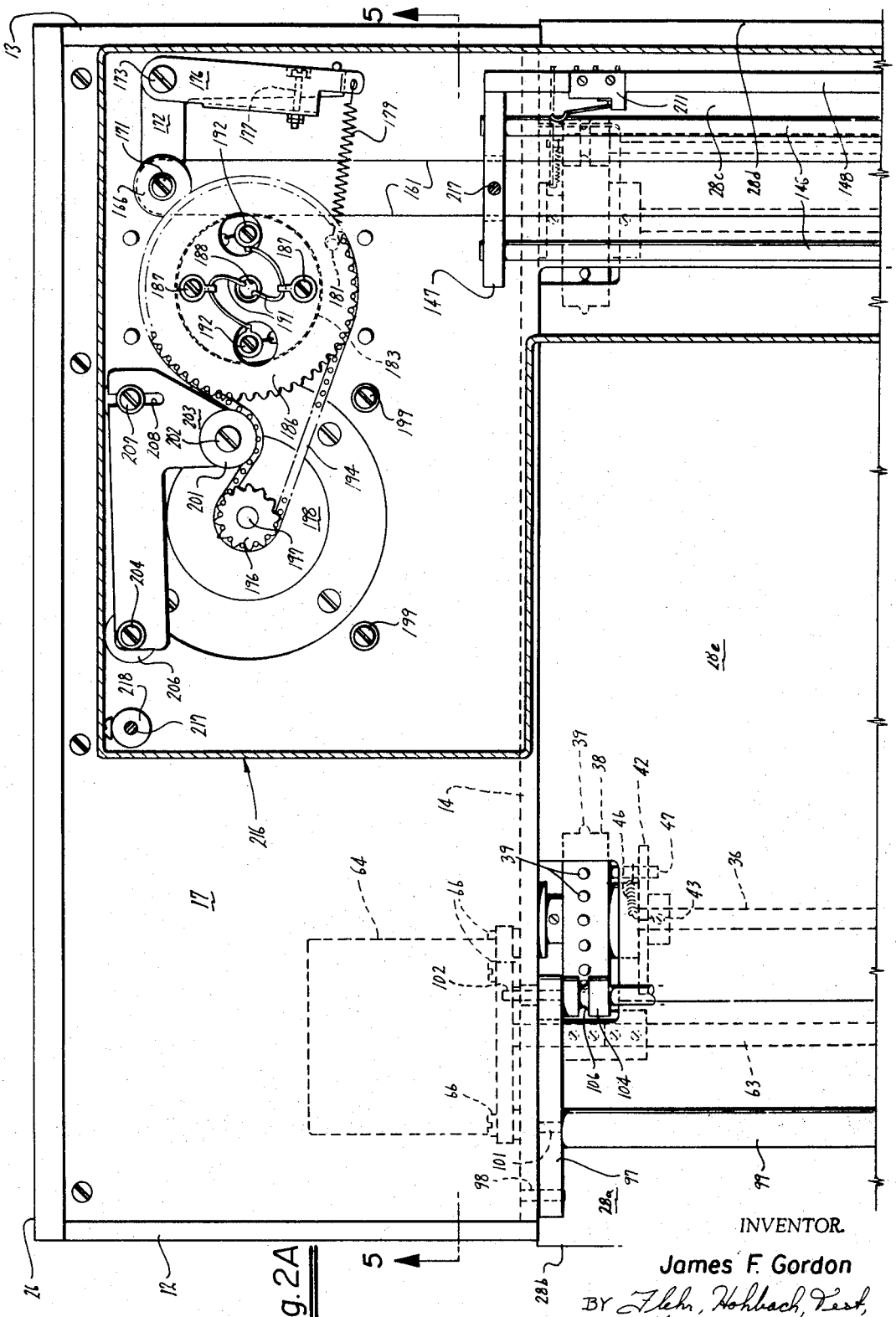

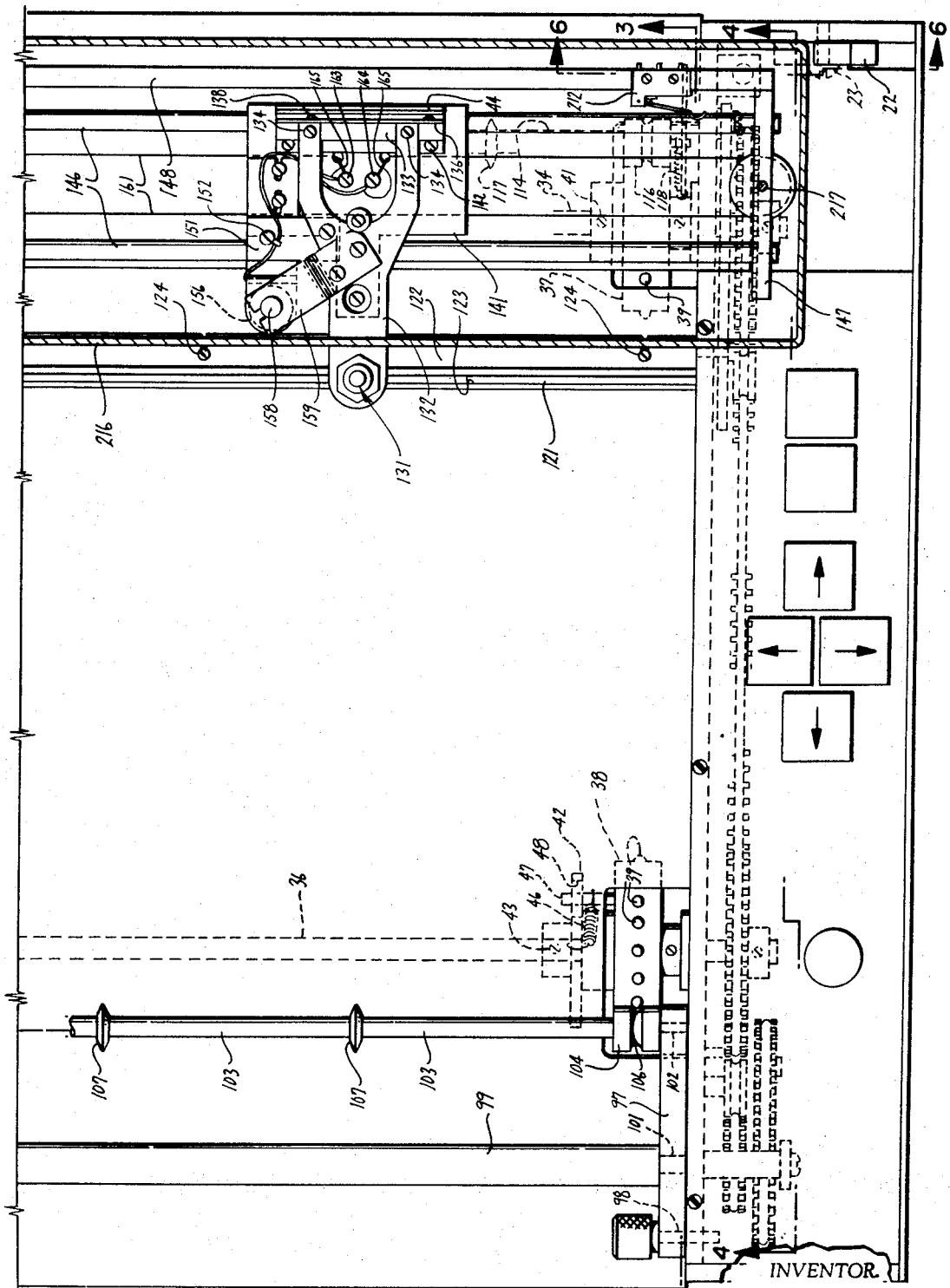

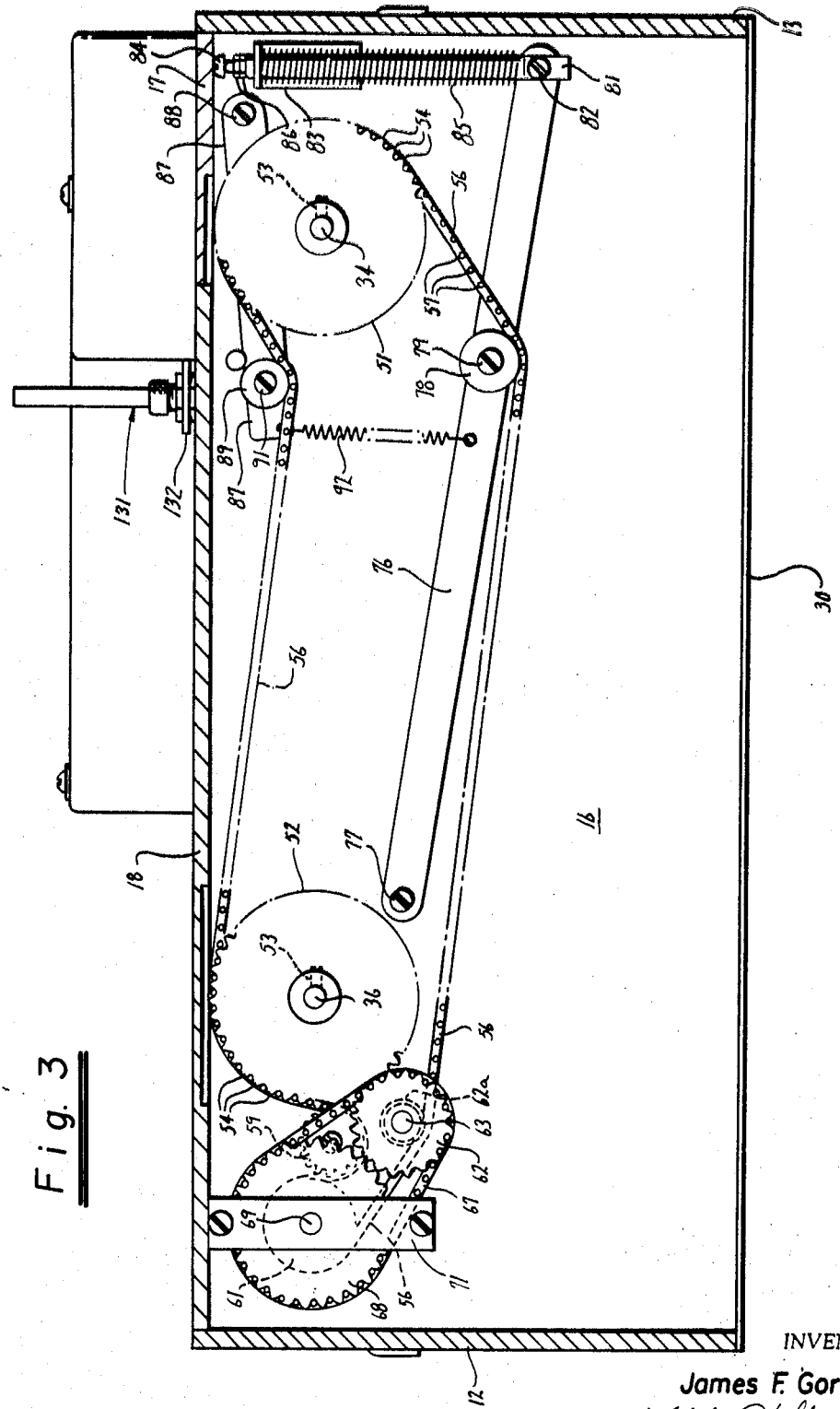

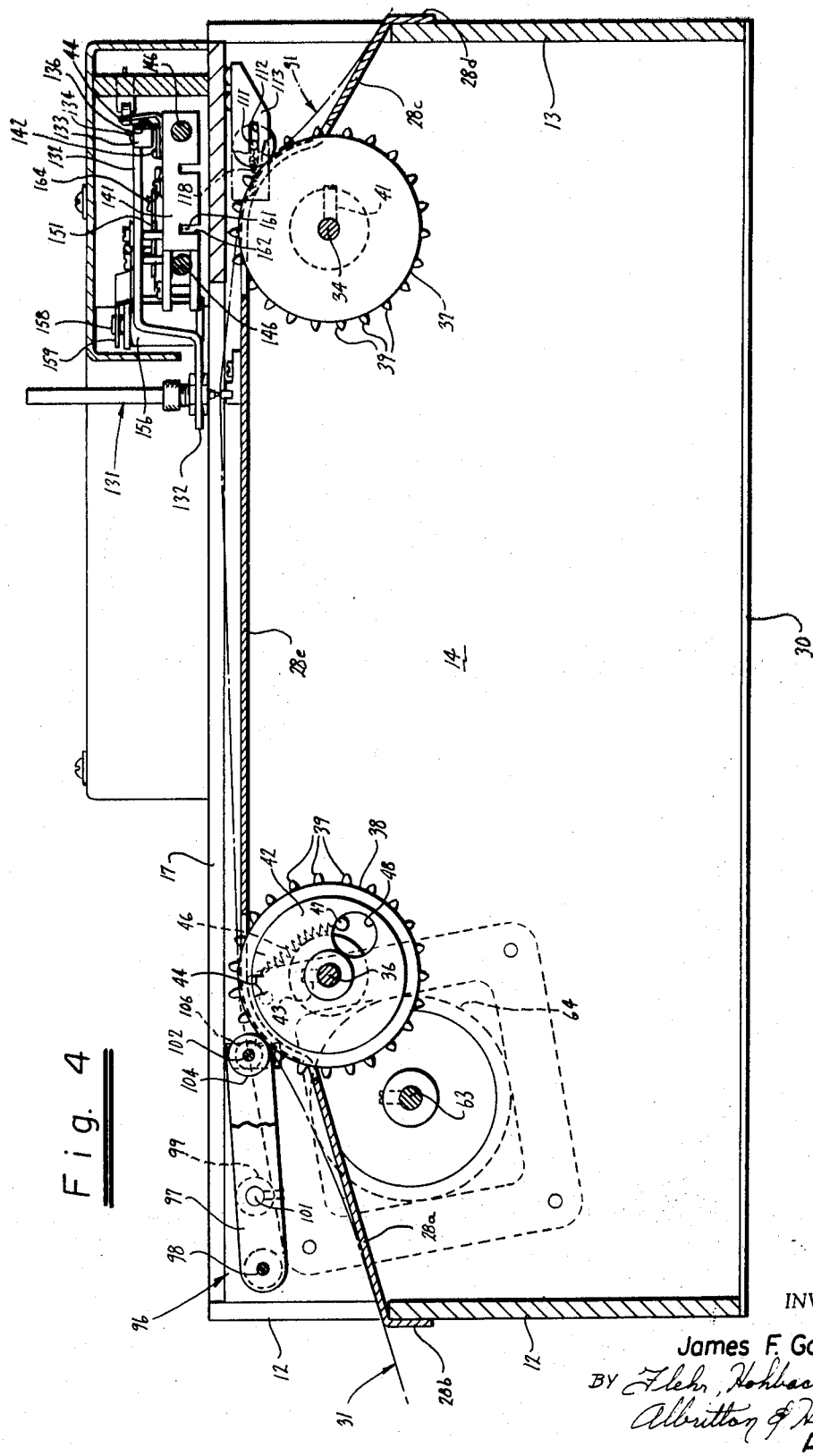

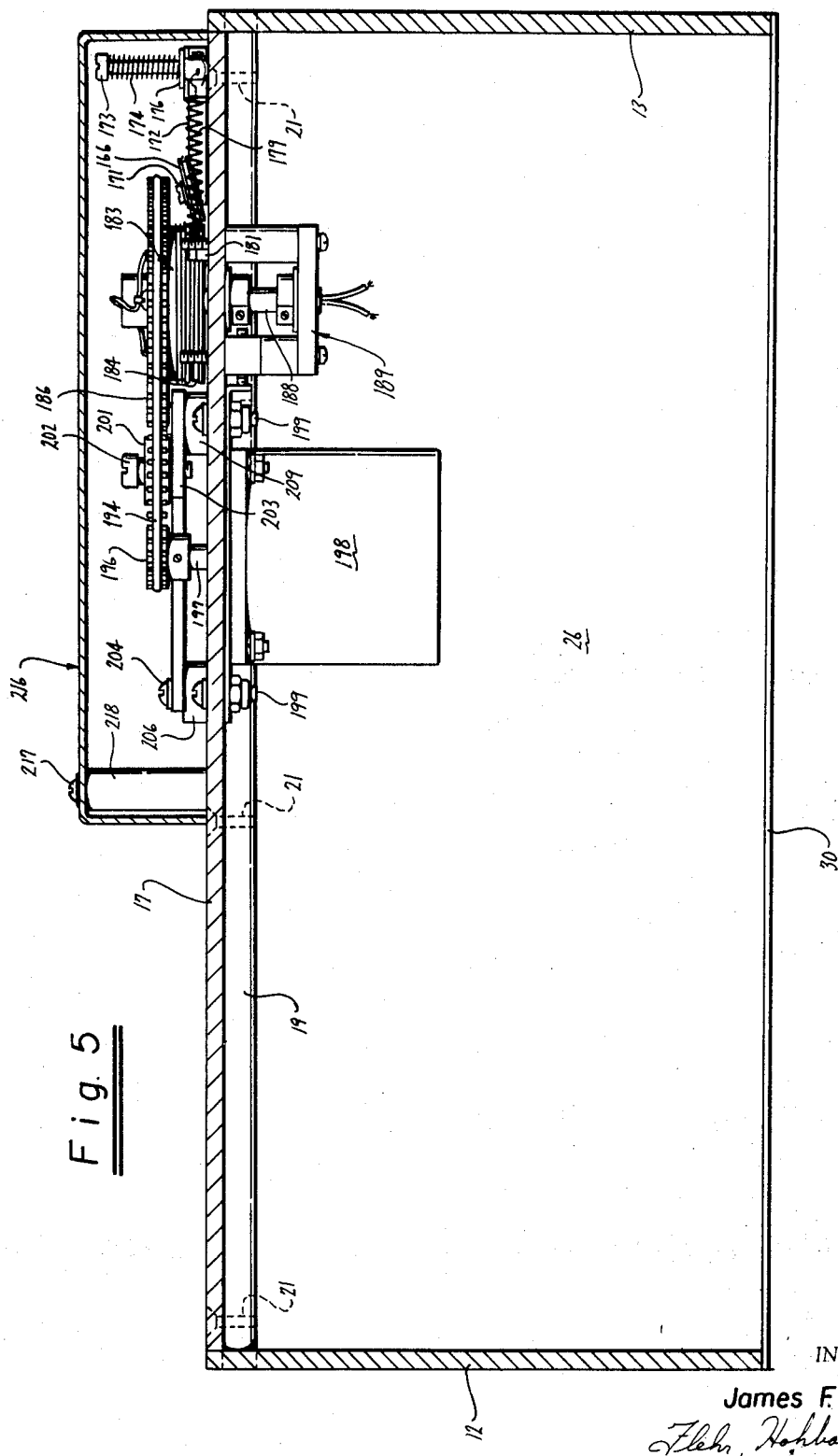

GRAPHIC RECORDER WITH PEN DRIVING AND ACTUATING MECHANISM

BACKGROUND OF THE INVENTION

Graphic recorders have heretofore been provided in which the strip chart is moved along an X-axis and the pen is moved along a Y-axis. Also in such recorders it has been necessary to provide means for moving the pen between a strip chart engaging position and a position out of engagement with the strip chart. When solenoid actuating means has been provided this has necessitated the use of separate electrical wires supplying energy to the solenoid which unduly complicates the graphic recorder. There is, therefore, a need for a new and improved graphic recorder.

SUMMARY OF THE INVENTION AND OBJECTS

The graphic recorder consists of a framework having a table adapted to carry a strip chart thereon. Means is mounted on the framework for causing movement of the strip chart on the table along an X-axis. The mounting block formed of insulating material is mounted on the framework for movement along an X-axis. A pen is carried by the mounting block and means is provided for yieldably urging the pen out of engagement with the strip chart. Solenoid operating means is carried by the mounting block and is provided for moving the pen into engagement with the strip chart against the force of the yieldable means. Means is provided for driving the block and the pen carried thereby along the Y-axis and also for supplying electrical energy to the solenoid operated means for the pen. This last means includes a pair of flexible elongate elements formed of conducting material which are connected to the block of insulated material and which are electrically connected to the solenoid operated means.

In general, it is an object of the present invention to provide a graphic recorder which has a novel pen actuating mechanism.

Another object of the invention is to provide a graphic recorder of the above character which has particularly simple and inexpensive means for driving and actuating the pen.

Another object of the invention is to provide a graphic recorder of the above character in which flexible elongate elements are provided which serve as means for driving the pen and which also serve as means for supplying electrical energy to the pen.

Additional objects and features of the invention will appear from the following description in which the preferred embodiments are set forth in detail in conjunction with the accompanying drawing.

BRIEF DESCRIPTION OF THE DRAWING

FIG. 1 is an isometric view of a graphic recorder incorporating the present invention.

FIG. 2A and 2B are plan views partly in cross-section of the graphic recorder shown in FIG. 1.

FIG. 3 is a cross-sectional view taken along the line 3—3 of FIG. 2B.

FIG. 4 is a cross-section view taken along the line 4—4 of FIG. 2B.

FIG. 5 is a cross-sectional view taken along the line 5—5 of FIG. 2A.

FIG. 6 is a cross-sectional view taken along the line 6—6 of FIG. 2B.

DESCRIPTION OF THE PREFERRED EMBODIMENT

The graphic recorder incorporating the present invention consists of a framework 11. The framework 11 consists of spaced parallel front and rear plates 12 and 13 which are fastened together by plates 14 and 16 extending at right angles thereto and secured thereto by suitable means such as screws (not shown). A pair of top plates 17 and 18 are mounted on the plates 12 and 13 and 14 and 16.

The top plate 17 is L-shaped and is hingedly mounted on the framework 11 by securing the same to a rod 19 by a suitable means such as screws 21. The rod 19 is pivotally mounted in the front and rear plates 12 and 13. The top cover plate 17 is movable between open and closed positions. It is retained in a closed position by a latch 22 which is pivotally mounted on pin 23 secured to the rear plate 13. A spring 24 which has one end secured to the lower end of the latch 22 and the other end secured to a pin 25 mounted on the rear plate 13 yieldably urges the latch into a position in which it can engage the top cover plate 17 when it is moved to a closed position. A stop 20 is provided for preventing the latch 22 from moving beyond a predetermined position so that the latch 22 can be cammed away when the top cover plate is lowered into its closed position.

Side plates 26 and 27 and a bottom plate 30 are secured to the framework 11 to form a generally rectangular case 27. A top plate 28 is also secured to the framework 11 and serves to form a part of the case. As can be seen, particularly from FIG. 4, the top plate 28 is provided with a downwardly inclined portion 28a which extends downwardly toward the front of the case and an additional downwardly extending portion 28b which fits over the front plate 12 of the framework 11. The top plate 28 is also provided with an additional downwardly inclined portion 28c which extends toward the rear of plate 13 and a portion 28d which extends over the rear plate 13. The top plate 28 is provided with a planar portion 28e which provides a flat surface which serves as a platen or table.

Chart paper 31 of a conventional type such as a fan-folded chart paper which is provided with a plurality of perforations 32 along at least one edge of the same is adapted to travel over the top plate 28. As shown in the drawings, the chart paper can be provided with perforations 32 on each edge of the same.

Means is provided for advancing the chart paper over the top plate or platen 28 along the X axis and consists of first and second shafts 34 and 36 which are rotatably mounted in the plates 14 and 16 and extend at right angles thereto. A pair of sprockets 37 are mounted on the first shaft 34 in spaced apart positions and similarly a pair of sprockets 38 are mounted on the second shaft 36 in spaced apart positions. The sprockets 37 and 38 are provided with teeth 39 spaced uniformly about the periphery of the same which are adapted to engage the perforations 32 in the chart paper 31. As can be seen, the sprockets are arranged in pairs with each pair being adapted to engage the perforations on one side. It should be appreciated that if desired it would be possible to eliminate one pair of the sprockets. Of each pair of the sprockets, one can be considered to be a first sprocket and the other a second sprocket. Means is provided for mounting the sprockets on the shafts 34 and 36 so that one of the sprockets is affixed to the shaft and the other of the sprockets is yieldably mounted on the shaft to permit rotation relative to the shaft. Thus, as shown in FIG. 4, the sprockets 37 are affixed to the shaft by suitable means such as set screws 41. The other sprockets 38 are free floating between two angular positions and are spring loaded for rotational movement in one direction. Thus, there is provided a pair of discs 42 which are secured to the shaft by suitable means such as set screws 43. Each of the discs is provided with a plurality of slots 44 opening through its periphery which are adapted to be engaged by one end of a coil spring 46. The other end of the coil spring 46 is secured to a pin 47 mounted on the sprocket 38. The pin 47 extends into a hole 48 provided in the associated disc 42. This hole 48 has a diameter which is substantially greater than the diameter of the pin 47 so as to permit angular movement of the sprocket 38 through a predetermined angle with respect to the disc 42 and with respect to the shaft 36 on which the disc is mounted. The amount of tension which is applied by each spring 46 can be adjusted by placing one end of the spring in the desired slot of the slots 44 in the disc 42. The amount of angular movement permitted between the sprocket and the disc can be changed merely by changing the size of the hole 48 with respect to the size of the pin 47.

Means is provided for driving the sprockets 37 and 38 and consists of a pair of non-slip driving elements in the form of pulleys 51 and 52 which are secured to the shafts 34 and 36 by suitable means such as set screws 53. The pulleys 51 and 52 are provided with a pair of spaced parallel rows of teeth 54. A flexible elongate non-stretchable element in the form of a belt 56 engages the pulleys 51 and 52. The belt 56 is of a conventional type such as one made of fiber glass with a Neoprene covering to the same and having sideways extending teeth 57 which are adapted to cooperate with the teeth 54 provided on the pulleys 51 and 52. The belt 56 is of an endless type and is reeved over the pulleys 51 and 52. The belt 56 travels under the idler pulley 59 and over a driving pulley 61. The belt 56 then travels under the hub portion 62a of a drive pulley 62. The drive pulley 62 is secured to a shaft 63 which is rotatably mounted in the plates 14 and 16. The shaft 63 is driven by a stepping motor 64 of a conventional type such as one supplied by the Superior Electric Company of Bristol, Conn. The stepping motor 64 is secured to the side plate 14 by suitable means such as screws 66. Another flexible elongate element in the form of a belt 67 similar to the timing belt 56 is provided and is driven by the drive pulley 62. The timing belt 67 drives another timing pulley 68 which is affixed to a shaft 69 that is rotatably mounted in a bracket 71 and the side plate 16. The driving pulley 61 is also affixed to the shaft 69. Thus, it can be seen that when the stepping motor 64 is operated, the belt 67 will be driven which will cause the belt 56 to be drivien which in turn will cause the pulleys 51 and 52 to be driven.

Means is provided for causing rotation of the sprockets 37 and 38 on one of the shafts relative to the sprockets on the other shafts whereby tension can be applied to the strip chart 31 which is disposed between the sprockets 37 and 38. This means consists of a lever arm 76 which is pivotally mounted on the side plate 16 by a screw 77. An idler roller 78 is rotatably mounted upon a screw 79 threaded into the arm 76 intermediate the ends of the same. As can be seen, particularly from FIG. 3, the idler 78 is positioned in such a manner that it is adapted to engage the inner surface of the lower run of the belt 56. The outer free end of the arm 76 is pivotally connected to a push rod 81 by a screw 82. The push rod 81 is slidably mounted in a bracket 83 secured to the side wall 16. A screw 84 is threaded into the upper end of the push rod 81 and can be adjusted vertically with respect to the push rod 81 and locked in the adjusted vertical position by a lock nut 86. A tension compression spring 85 is mounted coaxially on the push rod 81 and has one end secured to the bracket 83 and the other end secured to the screw 82.

Another arm 87 is pivotally mounted on the side plate 16 by a screw 88. Another idler roller 89 is mounted on the arm 87 adjacent the outer free end of the same by a screw 91. The other roller 89 is positioned in such a manner that it engages the outer surface of the upper run of the timing belt 56. Means is provided for yieldably connecting the outer end of the arm 87 to an intermediate portion of the arm 76 and consists of a spring 92 which has one end secured to the outer end of the arm 87 and has the other end secured to the arm 76 at a point intermediate the pivot screw 77 and the roller 78.

A hold-down frame 96 is provided for engaging the top plate or table 28 to hold down the chart paper so that the chart paper will remain in engagement with the sprockets 38. The hold-down frame consists of a pair of side arm members 97 which are pivotally connected to the side frame members 14 and 16 by screws 98. A spacer rod 99 extends between the side arm members 97 and is secured thereto by screws 101. A shaft 102 extends between the outer free ends of the side arm members 97 and has mounted thereon sleeves 103. A roller 104 is provided on each end of the sleeve 103. Each roller 104 is provided with an annular recess 106 which is adapted to accommodate the teeth 39 of the sprocket 38. The rollers 104 are formed of a suitable material such as Delrin. A plurality of additional disc-shaped members 107 formed of a suitable material such as Delrin are spaced longitudinally of the sleeve 103 and are affixed thereto and are adapted to engage the chart paper and hold it down along the entire width of the chart paper as it is advanced.

A somewhat similar hold down is provided on the cover slots 17 and assembly 109 which is associated with the sprockets 37. This hold down means consists of a shaft 111 which is rotatably mounted in elongate slots 112 provided in brackets 113 secured to the bottom side of the top cover member 17. A sleeve 114 is rotatably mounted on the shaft 111 and carries rollers 116 similar to the rollers 104 and similarly carries spaced disc-like members 117 similar to the disc-like members 107. Yieldable means is provided for urging the shaft 111 in a direction toward the sprocket 37 and consists of springs 118 which have one end of each spring secured to the shaft 111 and have the other end secured to the bracket 113.

Particularly novel means is provided on the top plate or table 28 to facilitate the application of ink to the chart paper as hereinafter described. Such means consists of a rod 121 of relatively small diameter which is disposed transversely of the top plate or table 28 or in other words at right angles to the direction of travel of the chart paper and extending across the width of the table. This rod 121 is preferably formed of a material which creates little friction, such as Delrin or Teflon. For purposes hereinafter described, it is preferable that the rod 121 present an upper surface which is curved and which has a relatively small radius. Means is provided for securing the rod 121 to the table 28 and consists of a member 122 which is provided with a recess 123 which is open at the top and into which the rod 121 can be slipped. The member 122 is secured to the table 28 by suitable means such as screws 124 in such a manner that it can be adjusted to be aligned with the pen movement.

Operation of this portion of the graphic recorder may now be briefly described as follows. Let it be assumed that the chart paper is to be loaded into the recorder. When this is the case, the top cover plate 17 is shifted to an open position. The chart paper is then brought under the hold-down frame 96 and over the top of the table 28 and the perforations 32 brought into engagement with the sprockets 37 and 38. As soon as the perforations and the chart paper have been engaged by all four sprockets, the hold-down frame 96 can be shifted into position to hold the chart paper in engagement with the sprockets 38. The top cover plate 17 can also be lowered towards its closed position so that the paper hold-down assembly 109 engages the chart paper and retains it in engagement with the sprockets 37.

As the top cover plate 17 is being lowered into a closed position, it will engage a latch 22 and cam the same out of the way against the force of the spring 24 and then will engage the plunger push rod 81 to move the same in a downward direction. As the push rod or plunger 81 is pushed downwardly, it causes the arm 76 to be pivoted about the screw 76 to cause the roller 78 to move the lower run of the belt 56 downwardly. At the same time, the arm 87 will be pulled downwardly but to a lesser extent because of the yielding of the spring 92 so that the belt is retained in engagement with the pulley 51. However, because of the disparity of movements between the roller 89 and the roller 78, there will be some clockwise rotation of the pulley 51 which will cause similar clockwise rotation of the sprockets 37 engaging in the chart paper.

In other words, the downward movement of the arm 76 causes the bottom run of the belt to be extended whereas the upper run of the belt is shortened. When this occurs, the sprockets 37 and 38 are rotated away from each other which causes the tensioning or stretching of the chart paper. This tensioning or stretching of the chart paper is against the force of the yieldable means connecting the sprockets 38 to the disc 42. Thus as soon as the chart paper is taut, the springs 46 will yield so that the chart paper will not be torn or the perforations broken and so that a predetermined tension is applied to the chart paper. This tensioning of the chart paper serves to keep the chart paper taut at all times and serves to remove any creases or folds in the chart paper. In addition, it causes the chart paper to travel in close contact with the curved surface of the rod 121.

This tension will be continuously maintained on the chart paper during operation of the graphic recorder. Thus, the belt 56 can be driven in either direction while still maintaining the necessary desired tension on the chart paper. In other words, the tension applied to the chart paper remains constant regardless of the direction of travel of the chart paper caused by the stepper motor 64. It can be seen that this tensioning means which has been provided for the chart paper does not significantly increase the work required to drive the chart paper. There is no backlash because there is no lost motion between forward and reverse movement of the chart paper. Since belts have been utilized, there is a minimum of mechanical noise associated with operation of the graphic recorder. It also can be seen that with the tensioning means provided for the chart paper that the angular relationship between the sprockets 37 and 38 will be maintained throughout the operation of the graphic recorder.

When it is desired to remove the chart paper from the graphic recorder, it is merely necessary to manually open the latch 22 and to raise the top cover plate 17. As soon as this is done, the plunger 81 is released which permits the spring 92 to pull the arms 76 and 87 closer together. This then permits the lower run of the belt to straighten out whereas the upper run of the belt 56 is pulled downwardly. This causes the two pulleys 51 and 52 to be rotated in directions toward each other which in turn cause similar rotation of the sprockets 37 and 38 to release the tension on the chart paper so that the chart paper can be readily removed from the sprockets 37 and 38.

From the foregoing, it can be seen that the upper and lower runs of the timing belt 56 alternatively cover a larger or a shorter distance depending upon the position of the plunger 81.

The graphic recorder is provided with means of making the chart paper which consists of a pen 131 of a conventional construction and which is threaded onto a holder 132. The holder 132 is secured to a bar 133 by screws 134. The bar 133 is secured to one leg of an L-shaped spring-like member 136 by screws 138. The spring members 136 are secured to a block 141 of a suitable insulating material by screws 142. A microswitch actuating member 44 is also secured to the block 141 by screws 142. The block 141 is slidably mounted on a pair of spaced parallel rods 146 mounted in spaced parallel plates 147 secured to the top side of the top cover plate 17. An additional support plate 148 extends between the plates 147.

Spring means is provided for yieldably urging the pen holder 132 in an upward direction and consists of a leaf spring 151 which has one end engaging the underside of the holder 132 and which has the other end secured to the block 141 by screws 152. Motive means is also provided for urging the holder 132 carrying the pen 131 in a downward direction against the force of the leaf spring 151 and consists of a solenoid 156 which is secured by a bracket 157 to the block 141. The solenoid 156 is provided with a plunger 158 which is secured to a leaf spring member 159. The other end of the leaf spring member 159 is secured to the holder 132. It can be seen that when the solenoid is energized and the plunger 158 is pulled downwardly, the spring member 159 will cause the holder 132 to be moved downwardly against the force of the leaf spring 151 to cause the pen 131 to be moved into engagement with the chart paper traveling over the curved surface provided by the rod 121.

Means is provided for causing movement of the block 141 and the pen 131 carried thereby in a Y direction, or in other words, longitudinally of the rods 146 and also at the same time supplying a current path for the energization of the solenoid 156. Such means consists of a pair of flexible elongate cables 161 formed of a suitable conducting material. The cables 161 extend into slots 162 provided in the block 141 and are terminated at screws 163 and 164. Small wires 165 are provided for connecting the screws 163 and 164 to opposite ends of the solenoid 156.

The flexible elongate cables 161 are reeved over a pulley 166 formed of insulating material and rotatably mounted on a pin 171 mounted upon an L-shaped lever arm 172. The L-shaped lever arm 172 is pivotally mounted on the top cover plate by a screw 173 which carries a compression spring 174. Another member 176 is also pivotally mounted on the screw 173 and is connected to the outer end of the L-shaped lever arm 172 by a bolt 177 in such a manner that limited relative movement can occur between the member 176 and the lever arm 172. Yieldable spring means is provided for applying a predetermined tension to the member 176 and in turn to the lever arm 172 to tension the flexible elongate cables 161 in the form of a spring 179 which has one end connected to the member 176 and which has the other end connected to a pin 181 mounted upon the top cover plate 17.

The other ends of the two lengths of cables 161 are wound onto a drum 183 formed of an insulating material. The drum 183 is provided with two vertically spaced grooves 184 so that one cable 161 is wound in one of the grooves and the other cable is wound in the other of the grooves. A pulley 186 is mounted upon the drum 183 and is secured thereto by screws 187. The pulley 186 and the drum 183 are secured to a hollow shaft 188 which is rotatably mounted in a support structure 189 secured to the bottom side of the cover plate 17. A pair of wires 191 extend upwardly through the hollow shaft 188 and are connected to terminals 192 which are connected to the two cables 161.

Means is provided for driving the pulley 186 and consists of a belt 194 of a type similar to the belt hereinbefore described. The timing type belt 194 is driven by a pulley 196 which is mounted on the output shaft 197 of a stepper motor 198 of a type similar to that hereinbefore described and which is secured to the top cover plate 17 by bolts 199.

An idler 201 engages the belt 194 and is rotatably mounted on a pin 202 mounted upon an arm 203. The arm 203 is pivotally mounted upon a screw 204 secured to a post 206 mounted upon the top cover plate 17. The idler 201 is held in the desired position by a screw 207 which extends through a slot 208 provided in the arm and is threaded into a post 209 mounted upon the top cover plate 17.

A pair of microswitches 211 and 212 are mounted upon the plate 148 and are adapted to be engaged by the member 144 to limit the travel of the block 141 which carries the pen 131 between two extreme positions along the Y-axis.

A shroud 216 is provided for covering the pen drive mechanism which is mounted on the top of the cover plate 17 and is secured to the top cover plate 17 by screws 217 which extend into the plates 147 and into posts 218 (see FIG. 4).

Certain electronics is provided within the case 27 for supplying the necessary information to the stepping motors 64 and 198. Such electronics can be of conventional type if desired.

To operate such electronics, a control panel 221 has been provided on the top cover plate 18 and includes a plurality of pushbuttons one of which can be a power pushbutton 222. In addition, there are provided two pushbuttons 223 and 224 for actuating the stepper motor 64 to advance the chart paper along the X-axis in either of two directions. In addition there are provided two additional pushbuttons 226 and 227 which are provided for energizing the stepper motor 198 and for manually moving the same along the Y-axis in opposite directions. In addition, there is provided a pushbutton 228 which is provided for fast advance and a pushbutton 229 is provided for causing the solenoid to be energized to move the pen 131 into engagement with the chart paper.

It can be seen that there has been provided a particularly unique and novel mechanism for driving the pen. The mechanism drives the pen along the Y-axis in incremental steps by advancement of the stepping motor. At the same time, the cables which are provided for advancing the stepping motor along the Y-axis are utilized for supplying energy to the solenoid 156 which is utilized for moving the pen into engagement with the chart paper. This simplifies the construction and eliminates the need for any loose wires and the like for supplying the pen actuating solenoid.

As can be seen particularly from FIG. 4, the pen 131 immediately overlies the curved surface provided by the member 121 so that when the solenoid 156 is actuated the pen is moved into engagement with the paper which is in firm contact with the member 121. Because the member 121 is provided with a curved surface of relatively small radium, this curved surface has a tendency to substantially eliminate any creases or bends in the tensioned chart paper, and therefore, insures that the pen will properly mark the chart paper at all times without smudging and the like. In addition the member 121 maintains the paper out of engagement with the table except for the member 121 and thereby minimizes the friction between the chart paper and the table. It also maintains the chart paper at a constant elevation for engagement by the pen.

It is apparent from the foregoing that there has been provided a new and improved graphic recorder which has many advantages. The chart paper will always be maintained under a constant tension regardless of the direction of movement of the chart paper along the X-axis. The tensioning of the chart paper serves to retain it in firm engagement with the curved surface provided by the member 121 so that there is also provided a firm surface for the chart paper at the point at which it will be engaged by the pen.

In addition, the construction of the graphic recorder is such that it can be readily and economically manufactured and also can be readily maintained.

I claim:

1. In a graphic recorder, a framework having a table adapted to carry a strip chart, means mounted on the framework adapted to engage the strip chart for causing movement of the strip chart on the table along an X-axis, a mounting block, at least a portion of which is formed of insulating material, means on said framework for mounting said block on said framework for movement along a Y-axis, a pen holder carried by said mounting block, a pen mounted in said pen holder, means secured to said block and said pen holder for yieldably urging said pen out of engagement with the strip chart, solenoid-operated means carried by the mounting block and adapted to cause movement of the pen into engagement with the strip chart against the force of the yieldable means and means for moving the mounting block and the pen carried thereby along the Y-axis and for simultaneously supplying electrical energy to the pen, said last named means including a pair of flexible elongate elements formed of conducting material insulated from said framework and secured to the insulated portions of said mounting block and electrically connected to said solenoid operated means to serve as the sole electrical path for supplying electrical energy to the solenoid operated means and also to serve as the sole means engaging said mounting block for moving the mounting block along the Y-axis, said last named means including a drum formed of insulating material, said flexible elongate elements being wound on spaced apart positions on said drum, and means for engaging said drum for causing rotational movement of said drum, said means for causing rotational movement of said drum including a stepper motor and means for supplying electrical energy to said flexible elongate elements wound on said drum.

2. A graphic recorder as in claim 1 wherein said pen holder includes a member hingedly mounted on said mounting block, and wherein said means yieldably urging said pen out of engagement with the strip chart includes a spring member carried by the mounting block and engaging said member hingedly mounted on said mounting block and wherein said solenoid-operated means includes a solenoid, a plunger mounted in said solenoid and a spring member engaging said solenoid and connected to said member hingedly mounted on said mounting block.

3. A graphic recorder as in claim 1 together with an elongate element having an upper curved surface extending transversely of the table and adapted to be engaged by the chart paper as it is stretched, said elongate element immediately underlying the pen so that the pen engages the chart paper in the region immediately overlying said elongate element.

4. A graphic recorder as in claim 3 wherein said elongate element having a curved surface has a curved surface of relatively small diameter.

* * * * *